United States Patent
Edwards et al.

(10) Patent No.: US 7,925,837 B2
(45) Date of Patent: Apr. 12, 2011

(54) MAINTAINING WRITE CACHE AND PARITY UPDATE FOOTPRINT COHERENCY IN MULTIPLE STORAGE ADAPTOR CONFIGURATION

(75) Inventors: Joseph Roger Edwards, Rochester, MN (US); Robert Edward Galbraith, Rochester, MN (US); Adrian Cuenin Gerhard, Rochester, MN (US); Timothy James Larson, LaCrosse, WI (US); William Joseph Maitland, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/041,807

(22) Filed: Mar. 4, 2008

(65) Prior Publication Data
US 2009/0228646 A1 Sep. 10, 2009

(51) Int. Cl.
*G06F 13/14* (2006.01)

(52) U.S. Cl. .................................................. 711/141
(58) Field of Classification Search .................. None
See application file for complete search history.

(56) References Cited

U.S. PATENT DOCUMENTS

| | | | |
|---|---|---|---|
| 6,539,463 B1 * | 3/2003 | Kuwata | 711/162 |
| 7,657,781 B1 * | 2/2010 | Dixon et al. | 714/6 |
| 2003/0023808 A1 * | 1/2003 | Bakke et al. | 711/113 |
| 2006/0112032 A1 * | 5/2006 | Bakke et al. | 706/16 |
| 2007/0028136 A1 * | 2/2007 | Forhan et al. | 714/6 |

* cited by examiner

*Primary Examiner* — Duc T Doan
(74) *Attorney, Agent, or Firm* — Rabin & Berdo, PC

(57) ABSTRACT

A method, computer program product and computer system for maintaining write cache and parity update footprint coherency in a multiple storage adaptor configuration for storage adaptors in a storage subsystem, which includes providing atomic updating of the storage adaptors and the attached disk drives, enabling runtime addition and runtime subtraction of a storage adaptor in the multiple storage adaptor configuration, and maintaining write cache and parity update footprint coherency using atomic updating, runtime addition and runtime subtraction of a storage adaptor.

15 Claims, 4 Drawing Sheets

| Sequence Number | —101 |
|---|---|
| Adapter Vendor Product ID | —102 |
| Adapter Serial Number | —103 |
| Adapter World Wide Unique ID | —104 |

FIG. 1

MAINTAINING WRITE CACHE AND PARITY UPDATE FOOTPRINT COHERENCY IN MULTIPLE STORAGE ADAPTOR CONFIGURATION

BACKGROUND

1. Technical Field

The present invention relates to the synchronization between storage devices and non-volatile memory. More specifically, it relates to maintaining write cache and parity update footprint coherency in a multiple storage adaptor configuration for storage subsystems.

2. Background Information

Storage adaptors in a computer system often implement write caches to enhance performance. The write cache is typically non-volatile (e.g. battery backed), and is used to mask the write penalty from storage devices such as a RAID (redundant array of independent disks). A write cache can also improve the performance of a storage adaptor by coalescing multiple host operations placed in the write cache into a single destage operation which is then processed by the RAID layers or disk devices. However, there is a problem with current write cache implementations in that they indicate to the system that the data has been written to disks while in fact the data is still in the non-volatile memory of the adaptor. Therefore, if the single adaptor fails and loses the data in its write cache before it is actually written to the disks, the system will be corrupted.

Storage adaptors also use non-volatile memory to store "parity update footprints". Parity update footprints track parity stripes or portions of parity stripes for data storage, which may potentially be out of synchronization with the actual data. For example, data and parity are temporarily placed out of synchronization each time new data is written to a single disk in a RAID array. If the adaptor fails and loses the parity update footprints, it is possible that data and parity will be left out of synchronization, and the system will then be corrupted if later the parity is used to recreate data.

Because a single storage adaptor contains many single points of failure, it is common to utilize a multiple storage adaptor configuration in which two or more adaptors are combined to eliminate single points of failures. The multiple storage adaptor configuration can be used within a storage subsystem, within the same storage system, or between different storage systems. In such a configuration, the write cache data and parity update footprints can be copied (i.e. mirrored) from one adaptor into one or more other adaptors' non-volatile memory. Therefore, if any one adaptor fails, other adaptors will have the most current copy of cache data and parity update footprints. Each adaptor in the configuration typically has connectivity to the same set of disk drives.

SUMMARY

A method, computer program product and computer system for maintaining write cache and parity update footprint coherency in a multiple storage adaptor configuration for storage adaptors in a storage subsystem, which includes providing atomic updating of the storage adaptors and attached disk drives, enabling runtime addition and runtime subtraction of a storage adaptor in the multiple storage adaptor configuration, and maintaining write cache and parity update footprint coherency using atomic updating, runtime addition and runtime subtraction of a storage adaptor.

BRIEF DESCRIPTION OF DRAWINGS

FIG. 1 is a block diagram of the Input/Output Adaptor (IOA) to Device Correlation data or IOA to Array Correlation Data.

DETAILED DESCRIPTION

Figure 2:
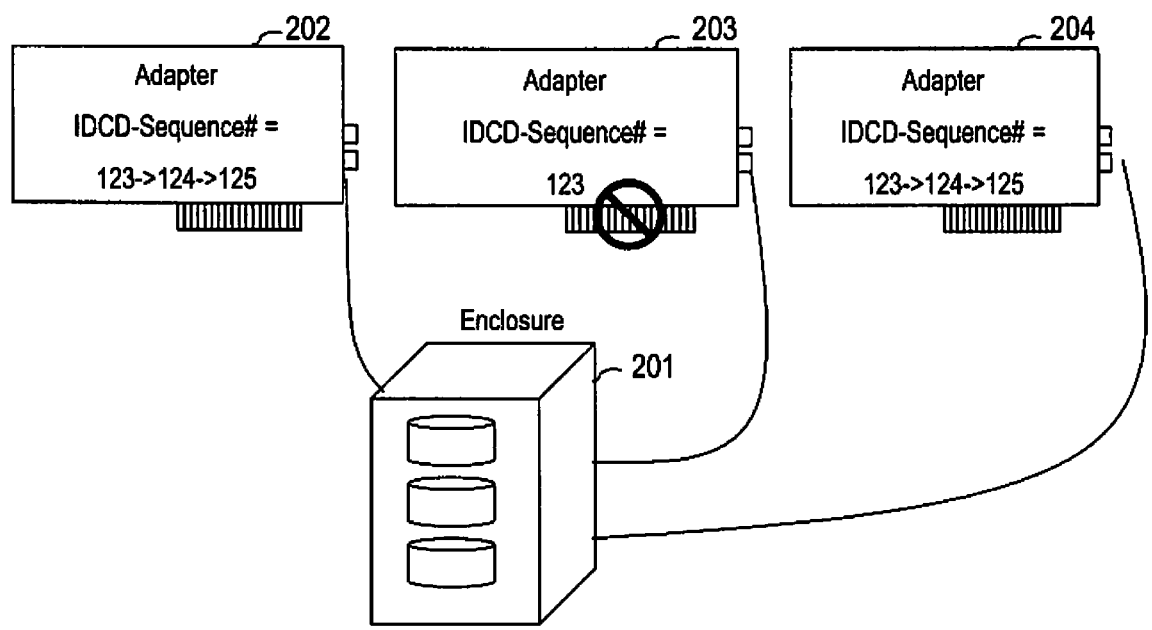
FIG. 2 is a diagram illustrating an example in which a failed adaptor is put out of synchronization with two other adaptors.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to the present invention, some of the critical issues for implementing a multiple storage adaptor configuration are how to get multiple adaptors in lockstep with respect to write cache data and parity update footprints, how to place an adaptor out of lockstep when the adaptor fails, and how to bring another adaptor into lockstep with the others while I/O operations are in progress. An I/O adaptor (IOA) must be able to determine at all times whether it has the most current set of write cache data and parity update footprints for the attached disk drives. The present invention provides a method to maintain correlation data between multiple adaptors and disk drives in order to detect if a particular adaptor is in write cache data synchronization and parity update footprint synchronization with a particular disk. The present invention also enables the runtime addition and subtraction of adaptors in a multiple storage adaptor configuration.

In one embodiment of the present invention, an IOA to Device Correlation data (IDCD) or IOA to Array Correlation Data (IACD) is utilized to detect if information for a particular adaptor is in synchronization with a particular disk or a disk array. FIG. 1 illustrates the IDCD/IACD. The IDCD/IACD contains information that uniquely identifies an adaptor, which includes a Vendor/Product Id 102, a Serial Number 103, and a worldwide unique ID (WWID) 104, and a sequence number 101. The IDCD/IACD is created by the primary adaptor that controls the device or the array. This primary adaptor then stores the IDCD/IACD in its own non-volatile memory, in metadata blocks kept on the disks, and in the non-volatile memory of other adaptors in the configuration by sending the IDCD/IACD to those adaptors using some communication mechanism (e.g. via a SAS fabric that connects the disk drives).

In this embodiment of the present invention, when two IDCDs or two IACDs are compared, they are not simply checked for absolute equality. The adaptor identifications are directly compared, but the sequence numbers are examined and considered to be equal if both IDCDs or IACDs have the same sequence number or their sequence numbers differ by a threshold (one is used as an example). So, incrementing the sequence number by one will not place the adaptors and devices out of synchronization, even if a failure occurs during the updating process. Therefore, the present invention provides an atomic form of updating to prevent one or more adaptors/devices from being placed out of synchronization when they should stay in synchronization. The sequence numbers of operational adaptors can be forced to be updated, e.g. by two (or more), so that the non-operational adaptor can be purposely placed out of synchronization. FIG. 2 illustrates an example in which a failed adaptor is put out of synchronization with two other adaptors. Adaptor 202 is the owner of device 201, and it mirrors cache into adaptor 203 and adaptor 204 for each host write operation. If adaptor 203 fails, adaptor 202 will disallow further writes into cache for device 201, and inform adaptor 204 to increment its corresponding IDCD sequence number by 1. Adaptor 202 will then increment its IDCD sequence number and the IDCD sequence numbers of the attached disk drives by 1. Both adaptor 202 and adaptor 204 will repeat the update process once, and then adaptor 202 will allow further writes into cache for device 201.

Figure 3:
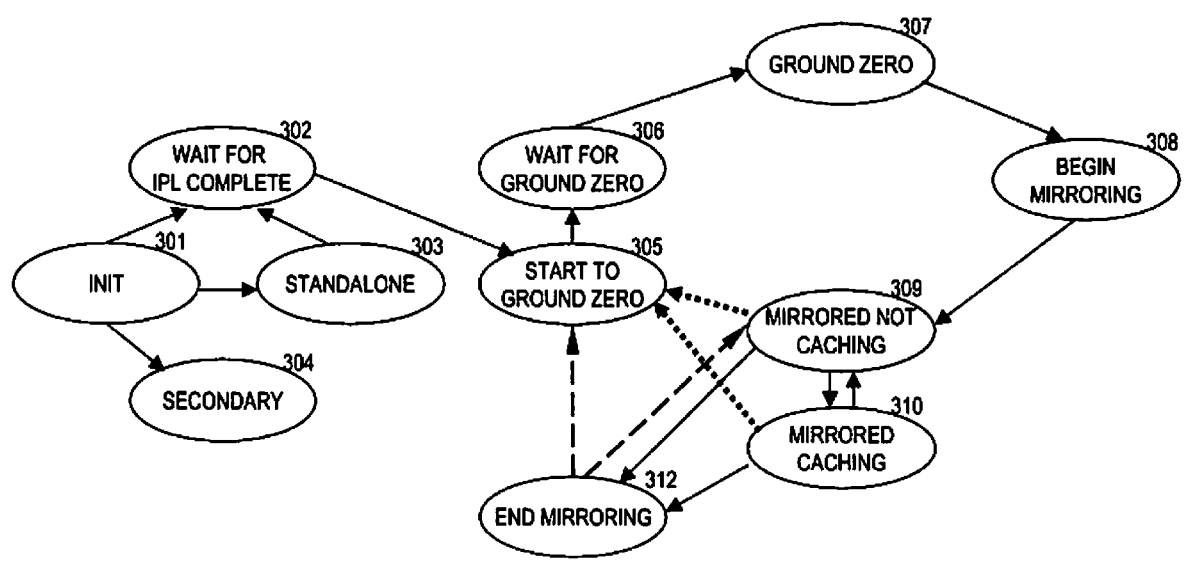
FIG. 3 is a diagram showing the addition or subtraction of an adaptor in a multiple storage adaptor configuration.

In one embodiment of the present invention, a Multiple IOA State Machine (MISM) can be used to demonstrate the runtime addition or subtraction of adaptors in the multiple storage adaptor configuration. FIG. 3 illustrates the MISM. Critical states for the addition of an adaptor in the MISM include:

(1) a Ground Zero state 307, which is entered before an adaptor is added to the multiple storage adaptor configuration. Entering the Ground Zero state 307 denotes that write caching has been successfully suspended, i.e. all caches have been flushed and no new data is being placed into the caches. However, parity updates for disk arrays continue on, and outstanding parity updates should be completed.

(2) a Begin Mirroring state 308, which is entered to bring two or more adaptors into synchronization. State 308 temporarily suspends all parity updates by allowing outstanding parity updates to complete and preventing new ones from starting, until there is no outstanding parity update footprint. Because write caching has already been suspended in the Ground Zero state 307, the IDCD/IACD can be updated on all adaptors and disks. When exiting the Begin Mirroring state 308, any new parity update footprint will be mirrored between adaptors.

(3) a Mirrored Not Caching state 309 and a Mirrored Caching state 310, which are entered when an IOA is mirrored, depending on whether write caching is not allowed or allowed, respectively. When write caching is allowed, new data placed in write cache will be mirrored between adaptors.

(4) a Start To Ground Zero state 305 and a Wait For Ground Zero state 306, which are entered if a new adaptor is to be added into the configuration. Adaptors already in the configuration can stay mirrored to each other as the Ground Zero state 307 is again entered.

A critical state for the subtraction of an adaptor is a End Mirroring state 312, which is entered when the communication with another adaptor fails, and there are still one or more adaptors left in the configuration. The IDCD/IACD is then updated on the remaining adaptors and disks so that the failed adaptor is placed out of synchronization with the remaining operational adaptors and disks. An interlock must be established to prevent new data being placed into write cache and new parity update footprints being created between the time when the communication with another adaptor is lost and when that failed adaptor has been placed out of synchronization. Once this is successfully done, the MISM will move to either the Mirrored Not Caching state 309 or the Start To Ground Zero state 305.

FIG. 3 illustrates the addition or subtraction of an adaptor in the multiple storage adaptor configuration. The MISM object has a Revaluate function that can be invoked by other parts of the IOA when certain events occur that may affect the state that MISM should be in. These events can be an IOA is determined to be the IOA in charge of the attached storage device, a link to an I/O adaptor is found or is lost, the initial IPL (Initial Program Load) process is completed, a new device shows up, or a remote IOA requires write caching to become degraded. Whenever a state changes a Revaluate will automatically be done in this new state by the MISM object itself.

When the IOA is first powered on, the Multiple IOA State Machine object (MISM) is put in the "Init" state 301. The "Init" state 301 is exited once the owner of the storage device is determined. A transition to the "Standalone" state 303 occurs if there are no other IOAs and the current IOA owns the storage device; a transition to the "Secondary" state 304 occurs when there is another IOA that owns the storage device, and the current IOA is a secondary IOA (e.g. an auxiliary adaptor or a dual-controller); and if there is another IOA and the current IOA owns the storage device, the MISM will move to the "Wait for IPL Complete" state 302. A transition from the "Standalone" state 303 to the "Wait for IPL Complete" state 302 will happen if a link from the storage devices to another IOA is discovered sometime after the IPL process.

The MISM moves from the "Wait for IPL Complete" state 302 to the "Start to Ground Zero" state 305 if the IPL process has completed. The "Start to Ground Zero" state 305 is a temporary state. In state 305, write cache is flushed and then disabled. The MISM will then switch to the "Wait for Ground Zero" state 306.

If there is any problem with the cache, e.g. data in the cache is for a device that the current IOA has no access to or devices attached are missing their cached data, the MISM will stay in the "Wait for Ground Zero" state 306. Otherwise, the MISM moves to the "Ground Zero" state 307.

The MISM will stay in the "Ground Zero" state 307 if there is another IOA but it is not detected. No caching is allowed in this state. The MISM will wait until a link becomes operational and another IOA is detected, and then switch to "Begin Mirroring" state 308, in which the MISM will stay when establishing the link with the other IOA. Once the link is established (or failed), it will switch to the "Mirrored Not Caching" state 309.

The "Mirrored Not Caching" state 309 is where the MISM stays if there is a link established with another IOA, the caches between the two or more IOAs are mirrored, but caching is not allowed for some reason, e.g. due to a battery problem. If after re-evaluation the caching should be started, the MISM is switched to the "Mirrored Caching" state 310; if another link comes active and needs to be mirrored, the MISM will switch to the "Start to Ground Zero" state 305; otherwise, if the link to one or more IOAs currently attached is failed, the MISM moves to the "End Mirroring" state 312.

The "Mirrored Caching" state 310 is the state in which the IOAs are mirrored with each other and data are write cached. If the caching stops for some reason, but the link is still active and can be mirrored with the other IOA, the MISM will switch back to the "Mirrored Not Caching" state 309; If one link is active and another link just comes active, all links must be in synchronization with respect to the cache, and the MISM will switch to the "Start to Ground Zero" state 305. If the link with one or more of the IOAs fails, the MISM will switch to "End Mirroring" state 312.

The MISM stays in the "End Mirroring" state 312 while the failing adaptor is put out of synchronization with the other remaining adaptors. If there is only one remaining adaptor, the IOA would have been reset so that cache data mirrored between the two IOAs would not be allowed to get out of synchronization. This cache data would then be written to the storage device during the next IPL process.

If at any point there is a single adaptor left operational, the write cache data, if any, will be immediately flushed to the disks. If at any point there is a single adaptor left operational, the parity update footprints will be kept on disk, as well as in the adaptor's non-volatile memory. This allows a failover to another adaptor (e.g. a replacement adaptor) should this single adaptor fail.

In FIG. 3, the dotted lines are where an additional IOA link becomes operational, and the dashed lines are where a link went down but there is still another operational link, thus no reset is needed. When there is a link failure in the "Wait for Ground Zero" state 306, "Ground Zero" state 307, "Mirrored Not Caching" state 309 or "Mirrored Caching" state 310, a transition to the "End Mirroring" state will occur (transitions from the "Wait for Ground Zero" state 306 and the "Ground Zero" state 307 are not shown in FIG. 3). These transitions enable the runtime addition and subtraction of an adaptor in the multiple storage adaptor configuration.

Figure 4:
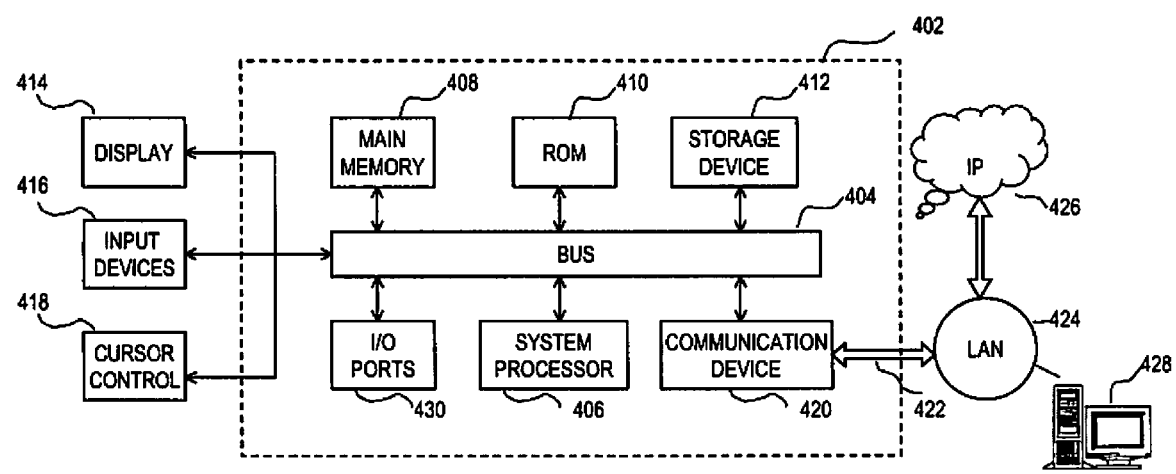
FIG. 4 is a conceptual diagram of a computer system in which the present invention can be utilized.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-3. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for maintaining the coherency of a write cache, and that of a parity update footprint, of each of a plurality of storage adaptors connected to a storage device, comprising:

creating a device correlation data for the storage device based on a first one of the storage adaptors, and storing the device correlation data on each of the storage adaptors and on the storage device, the device correlation data including a sequence number indicating a coherency status of the storage adaptors; and upon detection of a failure of a second one of the storage adaptors, increasing the sequence number of the device correlation data, stored on the storage device and on each of the storage adaptors other than the second storage adaptor, by one, and repeating the increasing a predetermined number of times, so as to atomically force the second storage adaptor out of synchronization, thereby maintaining the coherency of the write cache and of the parity update footprint of the other storage adaptors.

2. The method of claim 1, wherein the device correlation data further includes a unique identifier of the first storage adaptor.

3. The method of claim 1, further comprising determining whether a select storage adapter has correct write cache and parity update footprint coherency with a select disk drive, by comparing a sequence number of the select storage adaptor and a sequence number of the select disk drive, and considering the select storage adaptor has the correct coherency if a difference between the two sequence numbers is not more than the predetermined number.

4. The method of claim 1, further comprising, when a new storage adaptor connected to the storage device is added, suspending the write cache of each of the storage adaptors; stop creating new parity update footprints for the storage adaptors; and mirroring the parity update footprint of the storage adaptors to the new storage adaptor.

5. The method of claim 1, further comprising, during said increasing and repeating, establishing an interlock to prevent writing new data to the write cache and to prevent creating new parity update fingerprints.

6. A computer program product for maintaining the coherency of a write cache, and that of a parity update footprint, of each of a plurality of storage adaptors connected to a storage device, the computer program product comprising:
a non-transitory computer usable medium having computer usable program code embodied therewith, the computer usable program code comprising:
instructions to create a device correlation data for the storage device based on a first one of the storage adaptors, and to store the device correlation data on each of the storage adaptors and on the storage device, the device correlation data including a sequence number indicating a coherency status of the storage adaptors; and
instructions to increase, upon detection of a failure of a second one of the storage adaptors, the sequence number of the device correlation data, stored on the storage device and on each of the storage adaptors other than the second storage adaptor, by one, and to repeat the increasing a predetermined number of times, so as to atomically force the second storage adaptor out of synchronization, thereby maintaining the coherency of the write cache and of the parity update footprint of the other storage adaptors.

7. The computer program product of claim 5, wherein the device correlation data further includes a unique identifier of the first storage adaptor.

8. The computer program product of claim 6, further comprising instructions to determine whether a select storage adapter has correct write cache and parity update footprint coherency with a select disk drive, by comparing a sequence number of the select storage adaptor and a sequence number of the select disk drive, and considering the select storage adaptor has the correct coherency if a difference between the two sequence numbers is not more than the predetermined number.

9. The computer program product of claim 6, further comprising instructions, when a new storage adaptor connected to the storage device is added, to suspend the write cache of each of the storage adaptors, to stop create new parity update footprints for the storage adaptors, and to mirror the parity update footprint of the storage adaptors to the new storage adaptor.

10. The computer program product of claim 6, further comprising instructions to establish an interlock for said increasing and repeating to prevent writing new data to the write cache and to prevent creating new parity update fingerprints.

11. A computer system, comprising:
a processor;
a memory operatively coupled with the processor;
a storage device operatively coupled with the processor and the memory; and
a computer program product for maintaining the coherency of a write cache, and that of a parity update footprint, of each of a plurality of storage adaptors connected to a storage device, the computer program product comprising:
a non-transitory computer usable medium having computer usable program code embodied therewith, the computer usable program code comprising:
instructions to create a device correlation data for the storage device based on a first one of the storage adaptors, and to store the device correlation data on each of the storage adaptors and on the storage device, the device correlation data including a sequence number indicating a coherency status of the storage adaptors; and
instructions to increase, upon detection of a failure of a second one of the storage adaptors, the sequence number of the device correlation data, stored on the storage device and on each of the storage adaptors other than the second storage adaptor, by one, and to repeat the increasing a predetermined number of times, so as to atomically force the second storage adaptor out of synchronization, thereby maintaining the coherency of the write cache and of the parity update footprint of the other storage adaptors.

12. The computer system of claim 11, wherein the device correlation data further includes a unique identifier of the first storage adaptor.

13. The computer system of claim 11, further comprising instructions to determine whether a select storage adapter has correct write cache and parity update footprint coherency with a select disk drive, by comparing a sequence number of the select storage adaptor and a sequence number of the select disk drive, and considering the select storage adaptor has the correct coherency if a difference between the two sequence numbers is not more than the predetermined number.

14. The computer system of claim 11, wherein further comprising instructions, when a new storage adaptor connected to the storage device is added, to suspend the write cache of each of the storage adaptors, to stop create new parity update footprints for the storage adaptors, and to mirror the parity update footprint of the storage adaptors to the new storage adaptor.

15. The computer system of claim 11, further comprising instructions to establish an interlock for said increasing and repeating to prevent writing new data to the write cache and to prevent creating new parity update fingerprints.

* * * * *